(12) United States Patent
Appeltauer et al.

(10) Patent No.: US 12,228,198 B1
(45) Date of Patent: Feb. 18, 2025

(54) ELECTRIC DRIVE SYSTEM FOR A MOTOR VEHICLE

(71) Applicant: MERCEDES-BENZ GROUP AG, Stuttgart (DE)

(72) Inventors: Peter Appeltauer, Fellbach (DE); Tobias Schilder, Ludwigsburg (DE); Tobias Haerter, Stuttgart (DE); Jonathan Zeibig, Aalen (DE); Peter Hahn, Stuttgart (DE); Andreas Kolb, Wernau (DE); Klaus Riedl, Tübingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/716,655

(22) PCT Filed: Nov. 8, 2022

(86) PCT No.: PCT/EP2022/081030
§ 371 (c)(1),
(2) Date: Jun. 5, 2024

(87) PCT Pub. No.: WO2023/104414
PCT Pub. Date: Jun. 15, 2023

(30) Foreign Application Priority Data

Dec. 6, 2021 (DE) ............... 10 2021 006 011.3

(51) Int. Cl.
*F16H 48/36* (2012.01)
*B60K 1/02* (2006.01)
*F16H 3/64* (2006.01)
*F16H 48/10* (2012.01)
*F16H 48/20* (2012.01)
*F16H 48/38* (2012.01)
(Continued)

(52) U.S. Cl.
CPC ............. *F16H 48/10* (2013.01); *B60K 1/02* (2013.01); *F16H 3/64* (2013.01); *F16H 48/20* (2013.01);
(Continued)

(58) Field of Classification Search
CPC ..... B60K 1/02; B60K 2001/001; F16H 48/36; F16H 2048/104; F16H 2048/106;
(Continued)

(56) References Cited

U.S. PATENT DOCUMENTS 10,836,427 B2 * 11/2020 Flaxman ............... B62D 11/16
2002/0014359 A1 * 2/2002 Schooler ............... B60K 6/445
903/910

(Continued)

FOREIGN PATENT DOCUMENTS

JP  H02125128 A  5/1990

OTHER PUBLICATIONS

International Search Report and Written Opinion mailed Feb. 15, 2023 in related/corresponding International Application No. PCT/EP2022/081030.
(Continued)

*Primary Examiner* — Sherry L Estremsky
(74) *Attorney, Agent, or Firm* — PATENT PORTFOLIO BUILDERS PLLC

(57) ABSTRACT

An electric drive system for a motor vehicle includes a first electric machine with a first rotor, a second electric machine with a second rotor, and a reduced coupling gearing, which has a first planetary gear set, a second planetary gear set, a first input shaft, a second input shaft, a first output shaft, and a second output shaft. The first input shaft introduces first torques emanating from the first electric machine into the reduced coupling gearing. The second input shaft introduces second torques emanating from the second electric machine into the reduced coupling gearing. The first output shaft diverts third torques from the reduced coupling gearing. The second output shaft diverts fourth torques from the reduced coupling gearing.

9 Claims, 3 Drawing Sheets

Figure 1:
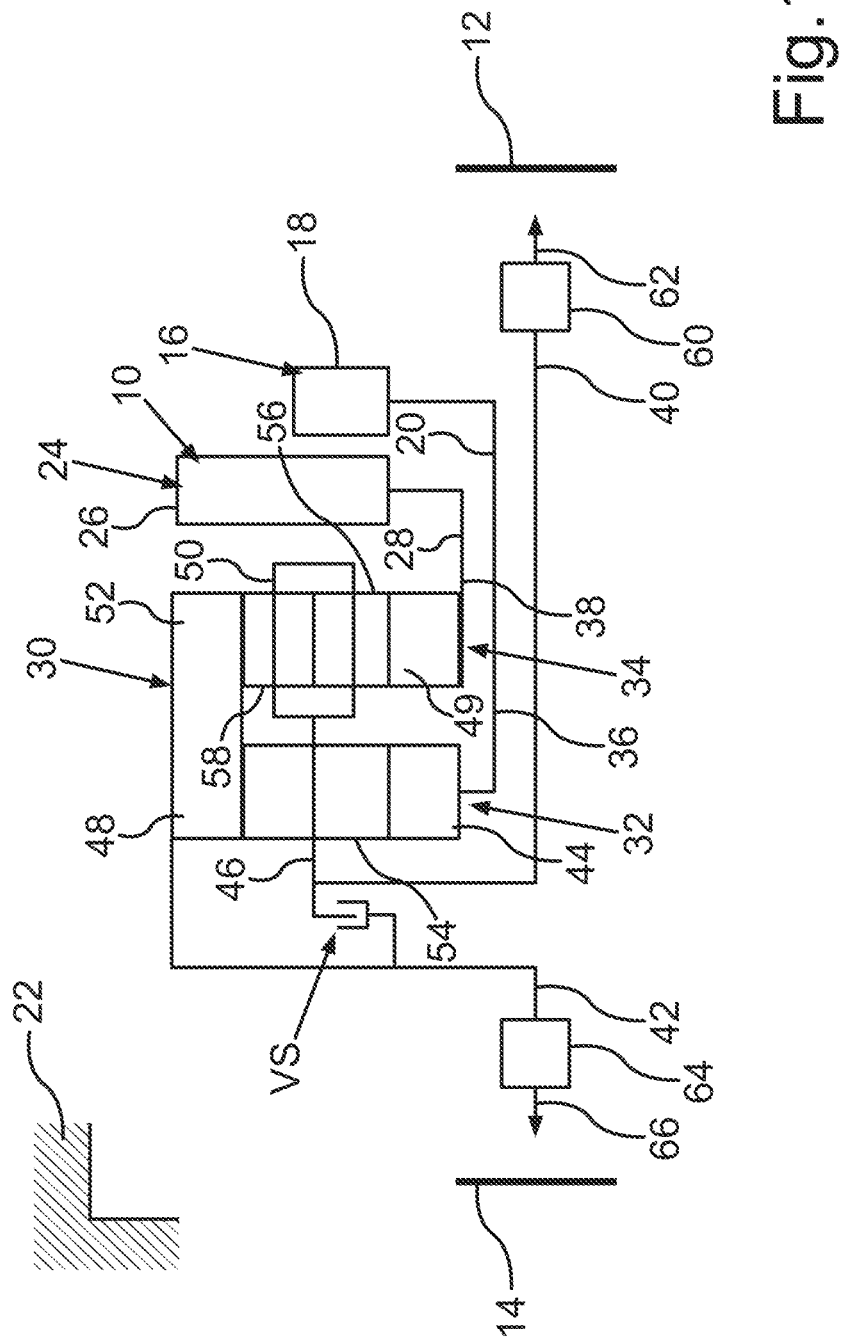

(51) Int. Cl.
*F16H 57/037* (2012.01)
*F16H 57/02* (2012.01)

(52) U.S. Cl.
CPC .............. *F16H 48/36* (2013.01); *F16H 48/38* (2013.01); *F16H 57/037* (2013.01); *F16H 2048/104* (2013.01); *F16H 2048/106* (2013.01); *F16H 2048/364* (2013.01); *F16H 2057/02034* (2013.01); *F16H 2057/02052* (2013.01); *F16H 2200/0021* (2013.01); *F16H 2200/2007* (2013.01)

(58) Field of Classification Search
CPC ....... F16H 2048/364; F16H 2200/0021; F16H 2200/2007
See application file for complete search history.

(56) References Cited

U.S. PATENT DOCUMENTS

| | | |
|---|---|---|
| 2007/0249456 A1 | 10/2007 | Meixner |
| 2011/0220428 A1* | 9/2011 | Ando ...................... B60L 50/16 |
| | | 903/902 |
| 2015/0065282 A1 | 3/2015 | Honda et al. |
| 2019/0176620 A1* | 6/2019 | Huh ......................... B60K 1/00 |
| 2024/0300577 A1* | 9/2024 | Mueller ................... B60K 6/48 |

OTHER PUBLICATIONS

Office Action created Aug. 1, 2022 in related/corresponding DE Application No. 10 2021 006 011.3.

* cited by examiner

ELECTRIC DRIVE SYSTEM FOR A MOTOR VEHICLE

BACKGROUND AND SUMMARY OF THE INVENTION

Exemplary embodiments of the invention relate to an electric drive system for a motor vehicle and to a torque vectoring method.

US 2015/0 065 282 A1 discloses a drive system for a motor vehicle with two electric machines and a coupling gearing, in which it is also possible to generate different wheel torques by selecting different torques provided by the electric machines. However, the known system is very complex to control.

An electric drive system with two electric machines and a coupling gearing of planetary design is known from US 2007/0 249 456 A1, where the two electric machines are connected to different shafts of the coupling gearing, enabling a so-called torque shift function.

Exemplary embodiments of the present invention are directed to an electric drive system for a motor vehicle so that particularly good drivability, a particularly compact design and simple controllability can be realized.

The invention relates to an electric drive system for a motor vehicle, in particular for a car, also referred to as an electric drive device or designed as an electric drive device. This means that the motor vehicle has the electric drive system in its completely manufactured state and can be driven electrically, in particular purely electrically, by means of the electric drive system. In particular, the motor vehicle has, for example, at least or exactly two axles in its fully manufactured state, which are arranged in succession in the longitudinal direction of the vehicle and thus one behind the other. Each axle has, for example, at least or exactly two wheels, also referred to as vehicle wheels, with the wheels of each axle preferably being arranged on opposite sides in the transverse direction of the vehicle. The wheels are ground contact elements by means of which the motor vehicle can be supported or is supported on the ground in the vertical direction of the vehicle. For example, the electric drive system is assigned to at least one of the axles or exactly one of the axles, so that, for example, the wheels of at least or exactly one of the axles can be driven by means of the electric drive system. The wheels that can be driven by means of the electric drive system are also referred to as drive wheels. If the drive wheels and thus the motor vehicle are driven by means of the electric drive system while the motor vehicle is supported on the ground via the wheels in the vertical direction of the vehicle, the motor vehicle is driven along the ground and the wheels roll on the ground.

The electric drive system has a first electric machine with a first rotor. For example, the first electric machine has a first stator, by means of which the first rotor can be driven and can therefore be rotated about a first machine rotation axis relative to the first stator. The electric drive system also has a second electric machine, which has a second rotor. For example, the second electric machine has a second stator, by means of which the second rotor can be driven and can thus be rotated about a second machine rotation axis relative to the second stator. The electric drive system also has at least or exactly one reduced coupling gearing having a first planetary gear set, a second planetary gear set, a first input shaft, a second input shaft, a first output shaft, and a second output shaft. The first input shaft is designed to introduce first torques emanating from the first electric machine, in particular from the first rotor, into the reduced coupling gearing. In particular, this can be understood to mean that the first electric machine, in particular via its rotor, can provide the first torques, which can be introduced into the reduced coupling gearing via the first input shaft. This can be used to drive the reduced coupling gearing in particular. The second input shaft is designed to introduce second torques emanating from the second electric machine, in particular from the second rotor, into the reduced coupling gearing. In particular, this can be understood to mean that the second electric machine, in particular via its second rotor, can provide the second torques, which can be introduced into the reduced coupling gearing via the second input shaft, in particular bypassing the first input shaft. This allows the reduced coupling gearing to be driven.

It is also conceivable that the first torques can be introduced into the reduced coupling gearing via the first input shaft, bypassing the second input shaft. This can be understood to mean the following in particular: The first torques that can be provided or that are provided by the first electric machine, in particular by the first rotor, do not run or flow via the second input shaft on their way from the first electric machine, in particular from the first rotor, into the reduced coupling gearing, for example, so that the first torques bypass the second input shaft, so that the second input shaft, for example, is not connected to a first torque transmission path, via which the first torques provided by the first electric machine, in particular by the first rotor, can be transmitted from the first electric machine, in particular from the first rotor, to the first input shaft and introduced into the reduced coupling gearing via the first input shaft, is not arranged in the first torque transmission path or at least not in the first torque transmission path between the first electric machine and the reduced coupling gearing. The same applies to the second electric machine and the second torques. The second torques that can be provided or that are provided by the second electric machine, in particular by the second rotor, do not run or flow via the first input shaft on their path from the second electric machine, in particular from the second rotor, into the reduced coupling gearing, for example, and the second torques therefore bypass the first input shaft, so that the first input shaft, for example, in relation to a second torque transmission path, via which the second torques provided by the second electric machine, in particular by the second rotor, can be transmitted from the second electric machine, in particular from the second rotor, to the second input shaft and can be introduced into the reduced coupling gearing via the second input shaft, is not arranged in the second torque transmission path or at least not in the second torque transmission path between the second electric machine and the reduced coupling gearing.

The first output shaft is designed to divert third torques from the reduced coupling gearing. For example, the third torques result from the first torques introduced into the reduced coupling gearing and/or from the second torques introduced into the reduced coupling gearing. The second output shaft is designed to divert fourth torques from the reduced coupling gearing, in particular with bypassing of the first output shaft, wherein, for example, the fourth torques result from the first torques introduced into the reduced coupling gearing and/or from the second torques introduced into the reduced coupling gearing. In particular, it is conceivable that the first output shaft is designed to divert the third torques from the reduced coupling gearing, with bypassing of the second output shaft.

The first planetary gear set has a first sun gear, a first planet carrier, which is also referred to as the first support, and a first ring gear. The first sun gear, the first planet carrier, and the first ring gear are also referred to as the first gearing elements of the first planetary gear set. The second planetary gear set has a second sun gear, a second planet carrier, which is also referred to as a second support, and a second ring gear. The second sun gear, the second planet carrier, and the second ring gear are also referred to as second gearing elements of the second planetary gear set. A first one of the first gearing elements of the first planetary gear set is also referred to as a first element, a second one of the first gearing elements of the first planetary gear set is also referred to as a second element, and a third one of the first gearing elements of the first planetary gear set is also referred to as a third element. A first of the second gearing elements of the second planetary gear set is also referred to as a fourth element, a second of the second gearing elements of the second planetary gear set is also referred to as a fifth element, and a third of the second gearing elements of the second planetary gear set is also referred to as a sixth element. In the context of the present disclosure, ordinal number words also referred to as ordinalia, such as "first", "second", etc., are not necessarily used to indicate or imply a number or quantity, but to be able to unambiguously reference terms to which the ordinal number words are assigned or to which the ordinal number words refer. Therefore, the first of the second gearing elements is referred to as the fourth element, the second of the second gearing elements is referred to as the fifth element and the third of the second gearing elements is referred to as the sixth element.

The first element of the first planetary gear set is connected for conjoint rotation to the first rotor, in particular permanently, or the first element of the first planetary gear set can be connectable for conjoint rotation to the first rotor. In the context of the present disclosure, the feature that two components, such as the first element and the first rotor, are connected for conjoint rotation to one another is to be understood as meaning that the two components are arranged coaxially to one another and are connected to one another in such a way that they rotate, in particular about a common component rotation axis and/or relative to a housing element of the drive system, at the same angular speed, in particular when the components or one of the components are or is driven or one component drives the other component. In other words, in the context of the present disclosure, the term or expression of a connection for conjoint rotation of two rotatably mounted components means that the two components are arranged coaxially to each other and are connected to each other in such a way that they rotate at the same angular velocity. Furthermore, in the context of the present disclosure, the feature that two components are permanently connected for conjoint rotation to one another is to be understood as meaning that these components are not assigned a switching element which can be switched between a coupled state, in which the components are connected for conjoint rotation to one another, and a decoupled state, in which the switching element permits a relative rotation between the components, in particular about the aforementioned component rotation axes, but rather that the components are always or continuously, i.e. permanently, connected for conjoint rotation to one another. Furthermore, in the context of the present disclosure, the feature that two components, such as the first element of the first planetary gear set and the first rotor, can be connected for conjoint rotation to each other is to be understood as meaning that these components are assigned a switching element which can be switched between a coupled state and a decoupled state. In the coupled state, the components are connected for conjoint rotation to each other by means of the switching element assigned to the components. In the decoupled state, the switching element assigned to the components allows a relative rotation between the components, in particular about the aforementioned component rotation axis.

The second element of the first planetary gear set is, in particular permanently, connected for conjoint rotation to the first output shaft. The third element of the first planetary gear set is, in particular permanently, connected for conjoint rotation to the second output shaft. The fourth element of the second planetary gear set is, in particular permanently, connected for conjoint rotation to the second rotor. The fifth element of the second planetary gear set is, in particular permanently, connected for conjoint rotation to the second element of the first planetary gear set.

In order to be able to realize a particularly advantageous drivability of the motor vehicle, good controllability, and also a particularly compact design of the electric drive system, it is provided in a manner known per se that the sixth element of the second planetary gear set is, in particular permanently, connected for conjoint rotation to the third element of the first planetary gear set. Furthermore, it is also provided, in a manner known per se, that a first stationary gear ratio of the first planetary gear set has the same value and an opposite sign compared to a second stationary gear ratio of the second planetary gear set. In other words, the first planetary gear set has a first stationary gear ratio and the second planetary gear set has a second stationary gear ratio. The stationary gear ratios of the planetary gear sets have the same value, i.e., the same absolute amount, also known as the absolute value, although the stationary gear ratios of the planetary gear sets have different mathematical signs. This means that one of the stationary gear ratios has a positive mathematical sign (+) and the other stationary gear ratio has a negative mathematical sign (−). It has been found that in the electric drive system according to the invention it is particularly easy to set the third and fourth torques individually on the one hand, but on the other hand to set these torques in a simple manner in such a way that a constant total torque results from these two, namely the third torques and the fourth torques. Furthermore, in the electric drive system according to the invention, the third torques and the fourth torques are dependent on changes in the first torques and the second torques in a very simple manner. It has also been found that, if the stator ratios are set in accordance with the invention, internal torques in the reduced coupling gearing are minimized, so that the reduced coupling gearing can be designed to be particularly light and compact.

Preferably, the second gearing elements are provided in addition to the first gearing element. In particular, if the particular first gearing element is not connected for conjoint rotation to a housing device such as the aforementioned housing element of the drive system, for example, the particular first gearing element can be rotated about a first planetary gear set rotation axis of the first planetary gear set relative to the housing device, which is, for example, the aforementioned housing element. Accordingly, the particular second gearing element, for example, can be rotated about a second planetary gear set rotation axis of the second planetary gear set relative to the housing device, in particular if the particular second gearing element is not connected for conjoint rotation to the housing device. It is conceivable that the planetary gear sets are arranged coaxially to one another so that the planetary gear set rotation axes coincide.

According to the invention, it is provided that the first element of the first planetary gear set is the first ring gear, the fourth element of the second planetary gear set is the second ring gear, the third element of the third planetary gear set is the first sun gear, and the sixth element of the second planetary gear set is the second sun gear.

In order to be able to realize a particularly compact and thus space-saving design of the electric drive system, it is provided in one embodiment of the invention that the second element of the first planetary gear set is the first planet carrier, which is preferably designed as a single planet carrier with first planet gears. This is to be understood, in particular, as meaning that the first planet gears are rotatably mounted on the first planet carrier, in particular in such a way that the particular first planetary gear is rotatable about a corresponding first planetary gear rotation axis relative to the first planet carrier. In particular, it is provided here that the first planetary gear rotation axes run parallel to one another and are spaced apart. In particular, the first planetary gear rotation axes are evenly spaced from each other in pairs in the first circumferential direction of the first planetary gear set, in particular around the first planetary gear set rotation axis. It is preferably provided that the first planet gears are of identical design to one another and are arranged at the same height, in particular in the axial direction of the first planetary gear set, and in particular start at the same first height and end at the same second height, in particular in the axial direction of the first planetary gear set.

It has been shown here to be particularly advantageous if the fifth element of the second planetary gear set is the second planet carrier, which is preferably designed as a double planet carrier with second planet gears and third planet gears. This means in particular that the second planet gears and the third planet gears are rotatably mounted on the second planet carrier, in particular such that the particular second planetary gear is rotatable about a corresponding second planetary gear rotation axis relative to the second planet carrier, and that the particular third planetary gear is rotatable about a corresponding third planetary gear rotation axis relative to the second planet carrier. In particular, it is conceivable here that the second planetary gear rotation axes extend parallel to one another and are spaced apart from one another, in particular in the second circumferential direction of the second planetary gear set, in particular extending around the second planetary gear set rotation axis, it being conceivable, in particular, that the second planetary gear rotation axes are spaced evenly or equally apart from one another in pairs in the second circumferential direction of the second planetary gear set. It is also conceivable that the third planetary gear rotation axes run parallel to each other and are spaced apart from each other, in particular in the second circumferential direction of the second planetary gear set. Preferably, the third planetary gear rotation axes are spaced evenly or equally apart from one another in pairs in the second circumferential direction of the second planetary gear set. For example, the second planet gears can be of identical design. It is also conceivable that the third planet gears are of identical design. For example, the third planetary gear rotation axes run parallel to the second planetary gear rotation axes.

Thus, for example, the second planet gears are arranged at the same height in the axial direction of the second planetary gear set, and consequently the second planet gears begin and end at the same height when viewed in the axial direction of the second planetary gear set. Alternatively, or additionally, for example, the third planet gears are arranged at the same height in the axial direction of the second planetary gear set, so that the third planet gears preferably begin and end at the same height when viewed in the axial direction of the second planetary gear set. In particular, it is conceivable that the second planet gears are of the same design, i.e., identical in terms of their construction. Alternatively, or additionally, the third planet gears can be of identical construction, i.e., identical in terms of their design. In particular, it is conceivable here that the particular second planetary gear and the particular third planetary gear differ from one another in terms of their design. Alternatively, or additionally, it is conceivable that the particular second planetary gear and the particular third planetary gear are arranged at the same or different heights when viewed in the axial direction of the planetary gear set, i.e., start at the same height or at a different height and/or end at the same height or at a different height.

Furthermore, it is preferable for the first planet gears to be formed separately from the second planet gears and separately from the third planet gears.

Preferably, the second planet gears are in mesh with the second sun gear, with the particular second planetary gear being meshed with a corresponding one of the third planet gears and not with the second ring gear. The third planet gears are preferably meshed with the second ring gear, with the particular third planetary gear being meshed with a corresponding one of the second planet gears and not with the second sun gear.

In order to be able to provide a particularly compact design, it is provided in a further embodiment of the invention that the third element of the first planetary gear set and the sixth element of the second planetary gear set have the same toothing diameters, in particular the same pitch circle diameters, and also the same number of teeth in each case.

In a further, particularly advantageous embodiment of the invention, the electric drive system has a first transmission stage. In relation to a first torque flow, along which the third torques can be discharged from the reduced coupling gearing via the first output shaft, the first transmission stage is arranged in the first torque flow and thereby downstream of the first output shaft, and is therefore connected downstream or mounted downstream of the first output shaft. Conversely, the first output shaft is arranged in the first torque flow and upstream of the first transmission stage, consequently connected upstream or mounted upstream of the first transmission stage.

It has been shown here to be particularly advantageous if the electric drive system has a second transmission stage. In relation to a second torque flow, along which the fourth torques can be discharged from the reduced coupling gearing via the second output shaft, the second transmission stage is arranged in the second torque flow and downstream of the second output shaft. In other words, the second transmission stage is arranged in the second torque flow and connected downstream or mounted downstream of the second output shaft. Conversely, the second output shaft is arranged in the second torque flow and is arranged upstream of the second transmission stage, i.e., connected upstream or mounted upstream of the second transmission stage.

It has proven to be particularly advantageous here if the first transmission stage, the second transmission stage, the planetary gear sets, and the rotors are arranged in a common housing of the electric drive system. In particular, the housing can be the aforementioned housing element and/or the aforementioned housing device. The particular transmission stage has, for example, at least or exactly two corresponding gear wheels, which can, in particular, be designed as spur gears. Preferably, the corresponding gear wheels of the particular transmission stage are in, in particular direct, engagement with each other, so that, for example, the particular gear wheels form a corresponding spur gear stage or spur gear pairing. By using the transmission stages, a particularly advantageous and, in particular, particularly advantageously large transmission ratio can be achieved in a particularly space-saving manner.

In order to be able to keep the installation space requirement of the electric drive system particularly low, it is provided in a further embodiment of the invention that the reduced coupling gearing, the two rotors and the two transmission stages are all arranged coaxially to one another. Preferably, it is provided that the planetary gear sets are arranged coaxially to one another so that the planetary gear set rotation axes coincide. A coaxial arrangement of the rotors, i.e., one in which the rotors are arranged coaxially to one another, means that the machine rotation axes coincide. If the rotors are thus arranged coaxially to each other and coaxially to the planetary gear sets and thus coaxially to the reduced coupling gearing, the machine rotation axes coincide, the planetary gear set rotation axes coincide and the particular planetary gear set rotation axis coincides with the corresponding machine rotation axis.

It is also conceivable, for example, that the particular transmission stage has at least one transmission element, which can be designed as a gear wheel, in particular as a spur gear, for example. The particular transmission element of the corresponding transmission stage can be rotated relative to the housing element or the housing, in particular about a corresponding transmission element rotation axis. If the transmission stages are arranged coaxially to one another, the transmission elements of the transmission stages are arranged coaxially to one another so that the transmission element rotation axes coincide. If, for example, the transmission stages are arranged coaxially to each other, coaxially to the reduced coupling gearing and coaxially to the motors, the planetary gear set rotation axes, the machine rotation axes, and the transmission element rotation axes all coincide, whereby a particularly space-saving design can be provided.

In order to be able to keep the installation space requirement of the electric drive system particularly low, it is provided in a further embodiment of the invention that the reduced coupling gearing has exactly two planetary gear sets, namely the first planetary gear set and the second planetary gear set.

In addition, and advantageously, the transmission stages downstream of the reduced coupling gearing can also each be designed as a further planetary gear set. The additional planetary gear sets are advantageously designed as simple planetary gear sets.

In order to be able to provide a particularly advantageous drivability in a particularly space-saving manner, it is provided in a further embodiment of the invention that the electric drive system has a first switching element designed to connect the first rotor to the first ring gear for conjoint rotation. In particular, this means that the first switching element can be switched between a first coupled state and a first decoupled state. In the first coupled state, the first rotor and the first ring gear are connected for conjoint rotation to each other by means of the first switching element, so that the first rotor and the first ring gear rotate or can rotate together or simultaneously, i.e., at the same angular speed, in particular about the first planetary gear set rotation axis and/or relative to the housing element, in particular when the reduced coupling gearing is driven. In the first decoupled state, the first switching element permits relative rotations between the first rotor and the first ring gear, in particular about the first planetary gear set rotation axis. For example, the switching element can be moved, in particular translationally and/or relative to the housing element, between at least one first coupling position, which brings about the first coupled state, and at least one first decoupling position, which brings about the first decoupled state.

It has also proved to be particularly advantageous if the electric drive system has a second switching element designed to connect the first rotor to the second ring gear for conjoint rotation. In particular, this means that the second switching element can be switched between a second coupled state and a second decoupled state. In the second coupled state, the first rotor and the second ring gear are connected for conjoint rotation to each other by means of the second switching element, so that the first rotor and the second ring gear rotate or can rotate together or at the same angular velocity, in particular about the first or second planetary gear set rotation axis and/or relative to the housing element, in particular when the reduced coupling gearing is driven. In the second decoupled state, the second switching element permits relative rotations between the first rotor and the second ring gear, in particular about the first or second planetary gear set rotation axis. For example, the second switching element can be moved, in particular relative to the housing element and/or translationally, between at least one second coupling position, which brings about the second coupled state, and at least one second decoupling position, which brings about the second decoupled state.

In a further, particularly advantageous embodiment of the invention, the electric drive system has a blocking switching element to interconnect two elements of the reduced coupling gearing, which are not permanently connected to one another for conjoint rotation, in a frictionally engaged manner. In other words, the blocking switching element is assigned to two of the elements of the reduced coupling gearing, wherein the elements to which the blocking switching element is assigned are not permanently connected to each other for conjoint rotation. The blocking switching element can, for example, be switched between a third coupled state and a third decoupled state. In the third coupled state, the two elements to which the blocking switching element is assigned are connected to each other in a frictionally engaged manner by means of the blocking switching element. In the third decoupled state, the blocking switching element allows relative rotations between the elements to which the blocking switching element is assigned, in particular about the first and/or second planetary gear set rotation axis. The elements to which the blocking switching element is assigned can, for example, be elements of the same planetary gear set, i.e., two of the first gearing elements or two of the second gearing elements. In particular, the blocking switching element can be provided in addition to the first switching element and in addition to the second switching element. If the two elements to which the blocking switching element is assigned are non-positively connected to each other by means of the blocking switching element, this results in an equalization of the speeds of the non-positively coupled elements depending on the level of the frictional connection. Advantageously, in the third coupled state, the two elements mentioned, to which the blocking switching element is assigned, are not connected to each other for conjoint rotation, but are only connected to each other almost for conjoint rotation due to the aforementioned frictional connection.

It is conceivable that the respective transmission stage is designed as a respective, further planetary gear set. It is therefore conceivable that the first transmission stage is designed as a third planetary gear set and the second transmission stage is designed as a fourth planetary gear set, wherein the third planetary gear set is provided in addition to the first planetary gear set, in addition to the second planetary gear set and in addition to the fourth planetary gear set. Thus, for example, the particular aforementioned transmission element is a corresponding sun gear or a corresponding ring gear or a corresponding planet carrier of the corresponding third or fourth planetary gear set. Furthermore, it is preferable that a particular input of the corresponding further planetary gear set, i.e., the corresponding transmission stage, is a corresponding further sun gear of the particular further planetary gear set. Thus, for example, the third torques transmitted from the reduced coupling gearing via the first output shaft and provided in particular by the first output shaft can be introduced into the first transmission stage via the input, i.e., via the sun gear, of the first transmission stage designed as a third planetary gear set. Furthermore, for example, the fourth torques transmitted from the reduced coupling gearing via the second output shaft and provided, in particular, by the second output shaft can be introduced into the second transmission stage via the input, i.e., via the sun gear of the second transmission stage designed as the fourth planetary gear set. It has also proved to be advantageous if the particular further planet carrier of the respective further planetary gear set, i.e., the respective transmission stage, is a respective output or output drive of the respective transmission stage. Thus, for example, the first transmission stage in the form of the third planetary gear set can provide fifth torques via its further planet carrier, and can therefore transmit or dissipate fifth torques from itself, wherein, for example, the fifth torques result from the third torques that are or were introduced into the first transmission stage, in particular via the further sun gear of the first transmission stage. Furthermore, the second transmission stage, which is designed as the fourth planetary gear set, can thus provide sixth torques via its further planet carrier, for example, and can thus dissipate or divert them from itself, with the sixth torques resulting from the fourth torques, for example, which are or were introduced into the second transmission stage, in particular via the further sun gear of the second transmission stage. It has also been shown to be advantageous if the respective further ring gear of the respective transmission stage designed as the third or fourth planetary gear set is fixed to the housing, i.e., in particular permanently connected for conjoint rotation to the housing, wherein the housing is, for example, the housing element and/or the housing device.

It has also proven to be particularly advantageous if the reduced coupling gearing assumes the function of a planetary differential gearing, in particular with a torque vectoring function. The torque vectoring function is also referred to as a torque distribution function. In particular, this can be understood to mean the following: The electric drive system and thus the planetary coupling gearing are assigned, in particular precisely, to one of the axles and thus to the wheels of the one axle, so that the drive wheels can be driven by means of the electric machine via the planetary coupling gearing. Since the planetary coupling gearing preferably functions or is designed as a planetary differential gearing, the planetary coupling gearing allows different speeds of the drive wheels, for example when the motor vehicle is cornering, in particular in such a way that the drive wheel on the outside of the curve rotates or can rotate at a higher speed than the drive wheel on the inside of the curve.

It is conceivable that a differential lock of the reduced coupling gearing designed as a planetary differential gearing can be realized by means of the blocking switching element, so that preferably at least or exactly any two elements of the reduced coupling gearing and/or shafts of the reduced coupling gearing that are not yet connected to each other for conjoint rotation can be connected to each other in a frictionally engaged manner by means of the blocking switching element.

Also disclosed is a motor vehicle preferably designed as a car, in particular the aforementioned motor vehicle, wherein the motor vehicle has an electric drive system according to the invention. Advantages and advantageous embodiments of the electric drive system are to be regarded as advantages and advantageous embodiments of the motor vehicle, and vice versa.

The invention is based in particular on the following findings and considerations: The driving performance of any road vehicle is influenced by its particular drive concept in two respects. First, the installed and available power is decisive for the acceleration capacity of the vehicle when travelling in a straight line. In addition, the distribution of torque to the drive wheels, particularly when cornering, and thus to the drive wheel on the inside and outside of the bend, can be decisive for the lateral and longitudinal dynamics of the vehicle in individual, distinct phases of cornering. Cornering is considered to be any continuous change of direction with a certain yaw rate that cannot be completed by the vehicle at its maximum speed and/or during which the full installed and available power cannot be transferred from the drive wheels to the road, because their adhesion is stressed to a significant extent by the centrifugal forces accompanying the cornering maneuver. With regard to the distribution of the torque, it is known prior art that a symmetrical axle differential, which distributes the torque in equal proportions to both drive wheels of the axle, also known as the drive axle, during straight-ahead driving and which assigns different rotational speeds to the drive wheels according to the law of the torque distribution:

$n1=(n1+n2)/2+x$
$n2=(n1+n2)/2-x$ should be used. If, for example, such a different speed distribution occurs during cornering, such a differential gear can no longer distribute the torques to the individual drive wheels symmetrically, because the relative rotational movement in the bearings and the gearing of such a differential generates a frictional torque, whereby a slightly higher torque is directed to the slower drive wheel and a slightly lower torque to the faster drive wheel. The difference corresponds to the frictional torque of the differential. A good reference point for standard vehicle differentials is around 6 percent frictional torque.

However, such an open axle differential proves to be disadvantageous under certain circumstances, which is why two different systems for improving cornering dynamics have become established in the prior art: So-called differential locks, which specifically increase the internal frictional torque of the differential, thereby always providing the slower wheel with a higher torque corresponding to the lock value, and so-called torque vectoring, i.e., torque distribution, which can distribute torque at least almost arbitrarily regardless of the speed difference of the drive wheels of an axle. It is also known that a combination of both systems can be used to realize a structure which, assuming appropriate control of the vehicle, allows cornering at the physical limits of the vehicle. The present disclosure now presents a family of axle drives that are comparable in function and at least partially equivalent in performance in two basic versions, each with a different focus on driving dynamics and/or efficiency, in particular with two driving machines acting on one drive axle in the form of electric machines, in particular of any design, which, coupled to each other via a coupling gearing, jointly ensure the axle drive and thus enable so-called actuatorless torque vectoring solely via the control of the electric machine. In particular, the reduced coupling gearing is used as the coupling gearing. In particular, it is provided in the invention that, instead of a simple axle differential, the reduced coupling gearing is used, which is or can be regarded as a reduced coupling gearing and comprises the planetary gear sets, which are designed in particular as spur gear planetary gear sets and are also simply referred to as planetary sets. In particular, it can preferably be provided that the first stationary gear ratio of the first planetary gear set is −2, it preferably being provided that the second stationary gear ratio of the second planetary gear set is +2.

As already explained above, it is preferably provided in a first variant that the first element is the first sun gear, the fourth element is the second sun gear, the third element is the first ring gear, and the sixth element is the second ring gear. In a second variant, for example, it is provided that the first element is the first ring gear, the fourth element is the second ring gear, the third element is the first sun gear, and the sixth element is the second sun gear. Both variants combine two motors, preferably of different power, in the form of the electric machines to form an axle drive that is particularly capable of torque vectoring, especially in the form of the electric drive system. The electric machines are also referred to as drive machines, which are coupled in both variants, i.e., in both cases, via the same reduced coupling gearing in principle, wherein the elements of the planetary gear sets coupled to each other in both variants or cases can be, for example, the carrier, the ring gear in the first variant, and the sun gear in the second variant. As a result, a very compact coupling gearing in the form of the reduced coupling gearing can be realized in both variants.

Both variants can be symmetrized by means of a corresponding control strategy, which means that the total drive torque output by the drive axle remains constant over the entire range of symmetrical torque vectoring, regardless of the fact that the torque vectoring level and the oppositely directed gradient of the torques of the two wheel drives have the same gradient. With this symmetrization, not only the torque provided by the second electric motor is changed, but also that of the first electric motor in synchronization with it. The fact that the stationary gear ratios of the two planetary gear sets, i.e., the first planetary gear set and the second planetary gear set, of the reduced coupling gearing are of the same value but of different signs and are therefore anti-symmetrical proves to be particularly advantageous for this project. This anti-symmetry of the stationary gear ratios means that changes in the torques of the two electric machines in relation to the extent of torque vectoring can occur linearly, in opposite directions and with the same gradient. The different wheel torques resulting from this torque vectoring also change linearly, symmetrically, and in opposite directions. Overall, the reduced coupling gearing according to the invention thus results in torque vectoring that is particularly easy to control.

Due to the symmetrical behavior described, a total output torque, i.e., a sum of the two wheel torques of the axle, can be kept constant in a simple manner, although individual wheel torques are changed selectively at the same time. The total output torque is approximately equal to the sum of the third torques and the fourth torques. The third torques correspond approximately to one wheel torque, the fourth wheel torques to another wheel torque. The total output torque, which remains constant during symmetrical torque vectoring, should be emphasized in particular, as torque vectoring systems are primarily intended to improve the longitudinal and lateral dynamics of the vehicle. It is therefore advantageous for torque vectoring systems that the drive power also remains constant at a constant accelerator pedal position in order to make it easier for the driver of the motor vehicle to control the vehicle, regardless of the torque vectoring level actuated. Of course, the symmetrical torque vectoring of both variants presented can be combined with an ESP system that can be switched off if necessary, possibly even in stages, which helps to avoid the loss of vehicle stability. Such an ESP system can then also reduce the drive power, but torque vectoring should not. With both variants, a higher level of symmetrical torque vectoring can be achieved in a wider range than with concepts that divide the same installed total power equally between two independent motors that are not mechanically coupled to each other and each drive one wheel.

When travelling straight ahead at the differential point, when both drive wheels of the axle rotate at the same speed, both variants achieve the maximum possible mechanical efficiency of a drive axle in this functional state, which distributes the torques proportionally to two drive wheels, but does not prevent speed differences between the two drive wheels of the axle, as in this driving state the entire reduced coupling gearing of both preferred variants presented rotates en bloc, i.e., as a whole. Therefore, no gear losses occur. As a final axle ratio is still advantageous on both sides for both variants shown in most applications, particularly in the form of the gear ratios, both variants have a so-called fast differential (rotates faster than the drive wheels), which is particularly advantageous when the drive axles are supplemented with a differential lock, as this can be dimensioned correspondingly smaller, as the effectively achieved locking effect of the drive wheels must be multiplied by the final axle ratio. The first variant, in particular, is a drive system designed for maximum achievable driving dynamics with a given installed power. For example, both drive machines, i.e., both electric machines, are active in all driving situations. The second variant, on the other hand, is different. Due to the variable connection of the first electric motor, it is possible to choose between driving dynamics or efficiency-prioritizing driving programs. An efficiency mode in particular is more far-reaching than what could be achieved by software measures alone, because the second electric motor can, for example, be completely separated from the rest of the drivetrain or drive system.

In addition, due to their largely identical design, a modular drive system can be put together from the two variants presented and can cover a wide range of user expectations with a wide range of identical parts and different properties. Both variants allow what is known as actuatorless torque vectoring (torque distribution), for example by enabling torque vectoring, i.e., torque distribution, to be achieved simply by selectively controlling the two electric machines, in particular by distributing torque to the drive wheels. In addition, the second variant enables switching between three different states of the drive system, namely a torque vectoring mode, a boost mode and an efficiency mode, in particular with the aid of a single actuator, especially in the form of a three-state actuator, with the aid of which the three different states can be set.

Further advantages, features and details of the invention can be found in the following description of preferred embodiments and in the drawing. The features and combinations of features mentioned above in the description as well as the features and combinations of features mentioned below in the description of the figures and/or shown alone in the figures can be used not only in the combination indicated in each case, but also in other combinations or on their own, without departing from the scope of the invention.

BRIEF DESCRIPTION OF THE DRAWING FIGURES

Figure 2:
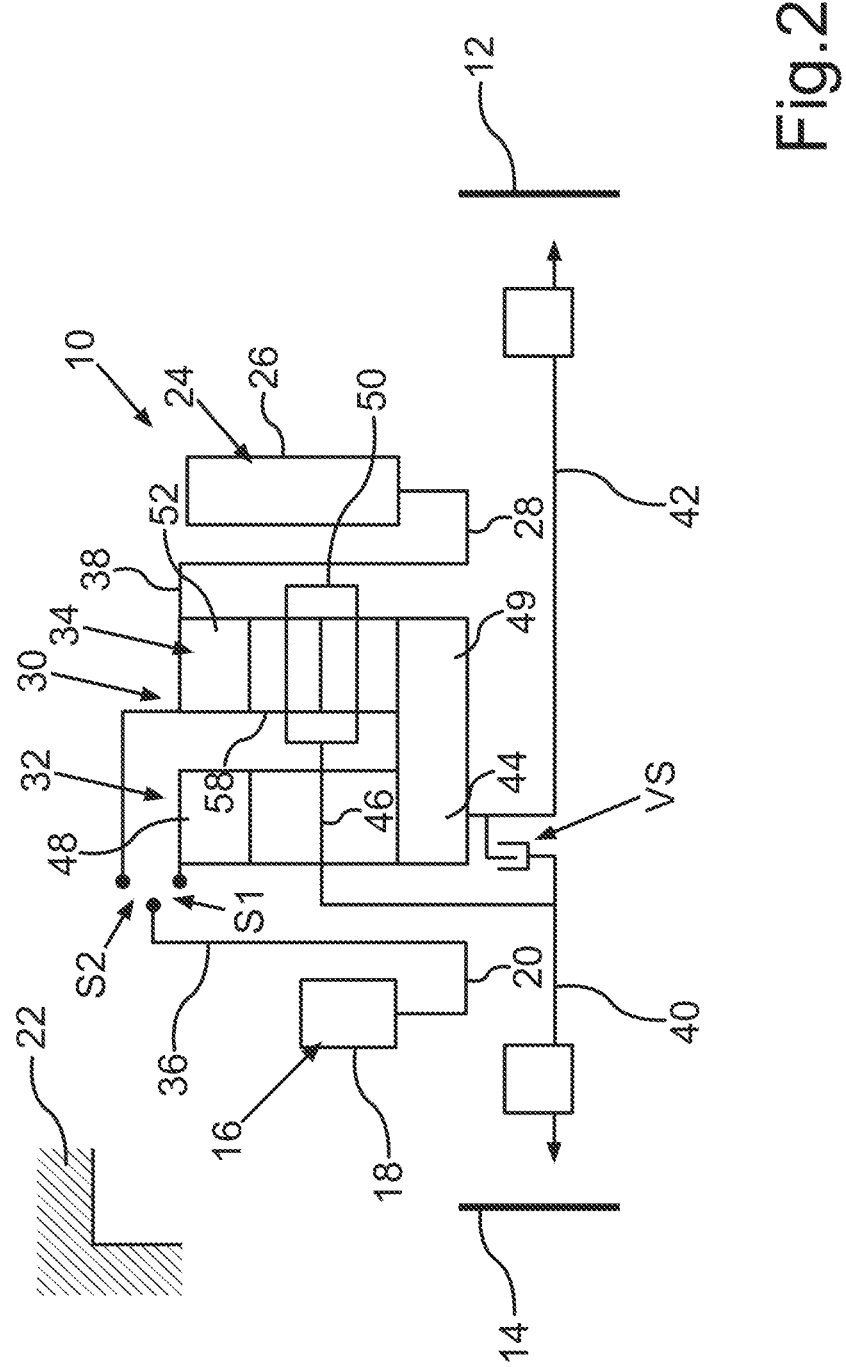
Figure 3:
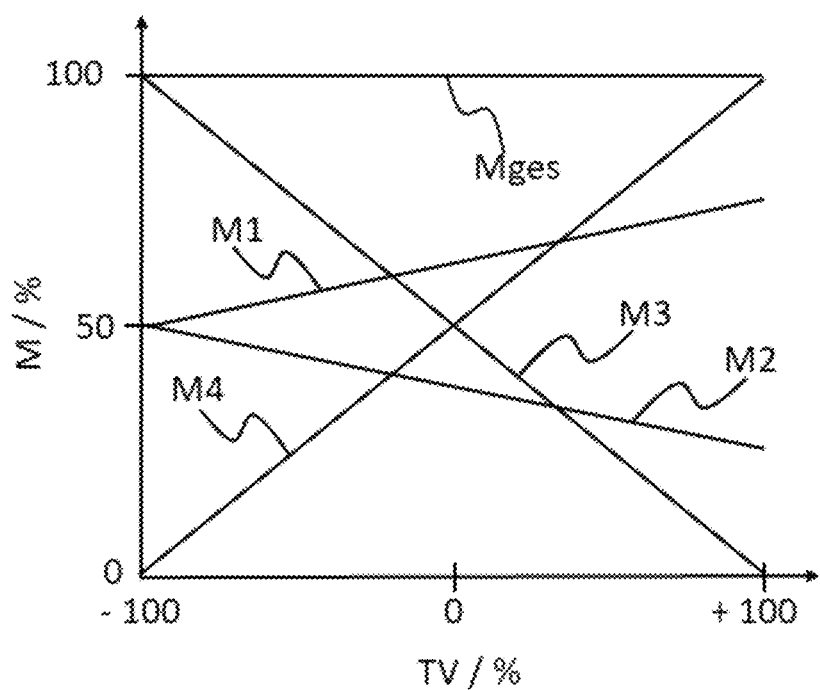

The drawing shows in:

FIG. 1 a schematic representation of an embodiment, not covered by claim 1, of an electric drive system for a motor vehicle, in particular for a motor car, FIG. 2 a schematic representation of an embodiment of the electric drive system according to the invention, and FIG. 3 a diagram describing an example of a torque vectoring process.

In the figures, identical or functionally identical elements are provided with the same reference signs.

DETAILED DESCRIPTION

FIG. 1 shows a schematic representation of a first embodiment of an electric drive system 10 for a motor vehicle, in particular for a motor car. Thus, the motor vehicle, which is also simply referred to as a vehicle, has the electric drive system 10 in its completely manufactured state, by means of which the motor vehicle can be driven electrically, in particular solely electrically. The motor vehicle has at least or exactly two axles arranged in succession in the longitudinal direction of the vehicle and thus one behind the other. Each axle has at least or exactly two wheels, also referred to as vehicle wheels, wherein the wheels of the particular axle are arranged on opposite sides of the motor vehicle in the transverse direction of the vehicle. For example, the drive system 10 is assigned to at least or exactly one of the axles, so that at least or only the wheels of the axle to which the electric drive system 10 is assigned can be driven by means of the electric drive system 10. The wheels that can be driven by means of the electric drive system 10 are also referred to as drive wheels. The drive wheels are shown particularly schematically in FIG. 1 and are denoted 12 and 14. The motor vehicle can be driven, in particular purely electrically, by driving the drive wheels 12 and 14 by means of the drive system 10. The drive system 10 has a first electric machine 16, which has a first stator 18 and a first rotor 20. The rotor 20 can be driven by means of the stator 18 and thereby rotated about a first machine rotation axis relative to the stator 18. The drive system 10 has a housing 22, shown particularly schematically in FIG. 1, which is also referred to as a housing device or housing element. The rotor 20 can be rotated here about the first machine rotation axis relative to the stator 18 and relative to the housing 22. The drive system 10 also comprises a second electric machine 24, which has a second stator 26 and a second rotor 28. By means of the stator 26, the rotor 28 can be driven and thereby rotated about a second machine rotation axis relative to the stator 26 and relative to the housing 22. In the first embodiment shown in FIG. 1, the electric machines 16 and 24 are arranged coaxially to one another so that the machine rotation axes coincide. The electric machine 16 can provide first torques via its rotor 20, and the second electric machine 24 can provide second torques via its second rotor 28.

The drive system 10 has a reduced coupling gearing 30, which has a first planetary gear set 32 and a second planetary gear set 34. In addition, the reduced coupling gearing 30 has a first input shaft 36, a second input shaft 38, a first output shaft 40, and a second output shaft 42. The first input shaft 36 is designed to introduce the first torques emanating from the first electric machine 16, i.e., provided by the electric machine 16 via the rotor 20 and thus by the rotor 20, into the reduced coupling gearing 30. The second input shaft 38 is designed to introduce the second torques emanating from the second electric machine 24, i.e., the second torques provided by the electric machine 24 via the rotor 28 and thus by the rotor 28, into the reduced coupling gearing 30. The first output shaft 40 is designed to divert third torques M3, which result for example from the first torques M1 and/or second torques M2 introduced into the reduced coupling gearing 30, from the reduced coupling gearing 30. The second output shaft 42 is designed to divert fourth torques M4, which result for example from the first torques M1 and/or second torques M2 introduced into the reduced coupling gearing 30, from the reduced coupling gearing 30.

The first planetary gear set 32 has a first sun gear 44 and a first planet carrier 46. In addition, the first planetary gear set 32 has a first ring gear 48. The second planetary gear set 34 has a second sun gear 49, a second planet carrier 50, and a second ring gear 52. In the first embodiment, the first sun gear 44 is a first element of the first planetary gear set 32. Furthermore, in the first embodiment, the sun gear 44 or the first element is, in particular permanently, connected to the first rotor 20 for conjoint rotation. In the first embodiment, the first planet carrier 46 is a second element of the planetary gear set 32. In the first embodiment, the first planet carrier 46 or the second element is, in particular permanently, connected to the first output shaft 40 for conjoint rotation. In the first embodiment, the first ring gear 48 of the first planetary gear set 32 is a third element of the first planetary gear set 32. In the first embodiment, the first ring gear 48 or the third element is, in particular permanently, connected to the second output shaft 42 for conjoint rotation.

In the first embodiment, the second sun gear 49 of the second planetary gear set 34 is a fourth element. In the first embodiment, the sun gear 49 or the fourth element is, in particular permanently, connected for conjoint rotation to the second rotor 28. In the first embodiment, the second planet carrier 50 is a fifth element. In the first embodiment, the planet carrier 50 or the fifth element is, in particular permanently, connected to the planet carrier 46 or to the second element for conjoint rotation. In the first embodiment, the second ring gear 52 is a sixth element. In the first embodiment, the second ring gear 52 or the sixth element is, in particular permanently, connected to the first ring gear 48 (third element) for conjoint rotation.

Furthermore, in the first embodiment, it is provided that the first planetary gear set 32 has a first stationary gear ratio, wherein the second planetary gear set 34 has a second stationary gear ratio. The stationary gear ratios have the same value, consequently the same absolute value. In addition, the stationary gear ratios have opposite or different mathematical signs. For example, in the first embodiment, it is provided that the first stationary gear ratio of the first planetary gear set 32 is −2. Accordingly, in the first embodiment, the second stationary gear ratio of the second planetary gear set 34 is +2, for example.

In the first embodiment, the first planet carrier 46 is designed as a single planet carrier, on which first planet gears 54 are rotatably held. The respective first planet gear 54 meshes, for example, in particular simultaneously, with the first sun gear 44 and with the first ring gear 48. In the first embodiment, the second planet carrier 50 is designed, for example, as a double planet carrier on which second planet gears 56 and third planet gears 58 are rotatably mounted. It is conceivable, for example, that the second planet gears 56 are meshed with the sun wheel 49 and with the third planet gears 58, it being conceivable that the third planet gears 58 are in mesh with the ring gear 52 and with the second planet gears 56, but are not meshed with the sun wheel 49. Thus, for example, the sun wheel 49 meshes with the planet gears 56, and the planet gears 58 mesh with the ring gear 52, wherein, for example, the planet gears 56 and 58 mesh with each other. Furthermore, the planet gears 56 do not mesh with the ring gear 52, and the planet gears 58 do not mesh with the sun gear 49. Furthermore, the first planet gears 54 are formed separately from the second planet gears 56 and separately from the third planet gears 58. Preferably, it is provided that the third element of the first planetary gear set 32 and the sixth element of the second planetary gear set 34 have the same gear diameters, in particular the same pitch circle diameters. Preferably, the third element and the sixth element also each have the same number of teeth. In the first embodiment, the third element is the ring gear 48 and the sixth element is the ring gear 52.

The electric drive system 10 has a first transmission stage 60 which, in relation to a first torque flow along which the third torques M3 can be discharged from the reduced coupling gearing 30 via the first output shaft 40, is arranged in the first torque flow and downstream of the first output shaft 40. For example, a first side shaft 62 is arranged in the first torque flow and is arranged in the first torque flow and downstream of the first transmission stage 60. The side shaft 62 can be driven by the output shaft 40 via the first transmission stage 60, wherein the drive wheel 12 can be driven by the side shaft 62 and thus by the transmission stage 60 via the side shaft 62. The drive system 10 also comprises a second transmission stage 64, which, in relation to a second torque flow, along which the fourth torques M4 can be discharged from the reduced coupling gearing 30 via the second output shaft 42, is arranged in the second torque flow and downstream of the second output shaft 42. A second side shaft 66 is arranged in the second torque flow downstream of the transmission stage 64, wherein the drive wheel 14 can be driven by the transmission stage 64 via the side shaft 66. In addition, the side shaft 66 can be driven by the output shaft 42 via the transmission stage 64. Accordingly, the side shaft 62 can be driven by the output shaft 40 via the transmission stage 60. Preferably, the transmission stage 60 is a third planetary gear set, it being conceivable that the transmission stage 64 is a fourth planetary gear set. Preferably, the third planetary gear set and the fourth planetary gear set are of identical construction, i.e., identical or the same in terms of their construction and thus in particular in terms of their transmission ratio.

Preferably, the third planetary gear set and the fourth planetary gear set are arranged coaxially to the reduced coupling gearing 30.

Furthermore, it has been shown to be particularly advantageous if the transmission stages 60 and 64, the planetary gear sets 32 and 34, and the rotors 20 and 28 are arranged in the common housing 22 of the electric drive system 10. In the first embodiment, it is also provided that the reduced coupling gearing 30, the rotors 20 and 28 and the two transmission stages 60 and 64 are arranged coaxially to one another.

In the first embodiment, the drive system 10 optionally has a blocking switching element VS, which, as it is provided as an option, can be omitted. In the present case, the planet carrier 46 and the ring gear 48 of the planetary gear set 32 can be connected to one another in a frictionally engaged manner by means of the blocking switching element VS. In this way, a differential lock of the reduced coupling gearing 30, which is designed or functions as a planetary differential gearing, can be realized by means of the blocking switching element VS.

FIG. 2 shows a schematic representation of a second embodiment of the drive system 10 according to the invention. In the second embodiment, the first ring gear 48 of the first planetary gear set 32 is the first element. In the second embodiment, the ring gear 48 or the first element can be connected to the first rotor 20 of the first electric machine 16. For this purpose, a first switching element S1 is provided, by means of which the first ring gear 48 or the first element can be connected to the rotor 20 for conjoint rotation. In the second embodiment, the first planet carrier 46 of the first planet gear set 32 is the second element. In the second embodiment, the planet carrier 46 or the second element is, in particular permanently, connected for conjoint rotation to the first output shaft 40. In the second embodiment, the first sun gear 44 of the first planetary gear set 32 is the third element. In the second embodiment, the sun gear 44 or the third element is, in particular permanently, connected for conjoint rotation to the second output shaft 42.

In the second embodiment, the second ring gear 52 of the second planetary gear set 34 is the fourth element. In the second embodiment, the second ring gear 52 or the fourth element is, in particular permanently, connected for conjoint rotation to the second rotor 28. In the second embodiment, the second planet carrier 50 of the second planet gear set 34 is the fifth element. In the second embodiment, the planet carrier 50 or the fifth element is connected, in particular permanently, for conjoint rotation to the planet carrier 46 (second element). In the second embodiment, the second sun gear 49 of the second planetary gear set 34 is the sixth element. In the second embodiment, the second sun gear 49 or the sixth element is, in particular permanently, connected for conjoint rotation to the sun gear 44 or to the third element.

In the second embodiment, the drive system 10 has a second switching element S2, by means of which the first rotor 20 of the first electric machine 16 is connected for conjoint rotation to the second ring gear 52. In particular, for example, the first input shaft 36 is connected, in particular permanently, to the rotor 20 for conjoint rotation. Alternatively, or additionally, for example, the input shaft 38 is connected, in particular permanently, for conjoint rotation to the rotor 28.

In the second embodiment, the electric drive system 10 has the blocking switching element VS, which is provided optionally and can therefore be omitted. In the second embodiment, the sun gear 44 and the planet carrier 46 of the first planetary gear set 32 can be connected to one another in a frictionally engaged manner by means of the blocking switching element VS, so that a differential lock of the reduced coupling gearing 30 can also be provided in the second embodiment by means of the blocking switching element VS.

In the first embodiment, for example, the planetary gear sets 32 and 34, which are designed in particular as spur gear planetary stages, have a common support, in particular in that the planet carriers 46 and 50 are connected to one another for conjoint rotation, in particular permanently. Furthermore, in the first embodiment, the planetary gear sets 32 and 34 have, so to speak, a common overall ring gear, since the ring gears 48 and 52 are connected to one another for conjoint rotation, in particular permanently. The sun gear 49 can be driven by the electric machine 24, and the sun gear 44 can be driven by means of the electric machine 16. The type of construction of the electric machines 16 and 24, which can be operated or function as motors or electric motors, may be irrelevant here. Outputs to the two drive wheels 12 and 14 are made via the common support of the reduced coupling gearing 30, which is designed as a reduced coupling gearing, for the drive wheel 12 and via the common overall ring gear for the drive wheel 14. This allows a particularly advantageous design, because it is very compact, of the reduced coupling gearing to be achieved, as none of the planetary gear sets 32 and 34, which are also referred to as planetary sets, are wrapped around by a shaft, so that connections can all be made directly over the shortest possible distance. A reduced coupling gearing designed in this way allows the total torque of the two motors to be distributed in different proportions to the side shafts 62 and 66 of the two drive wheels 12 and 14, which are designed as drive shafts, when the corresponding drive torque of the electric machines 16 and/or 24 is changed. Assuming that one of the electric machines 16 and 24 is more powerful than the respective other electric machine 24 or 16 and is therefore a more powerful main drive machine, the distribution of the drive torques to the two wheels (drive wheels 12 and 14) of the axle can be changed, for example, by modulating the drive torque of the other electric machine 24 or 16. The other electric machine 24 or 16 is thus also referred to as the auxiliary machine or auxiliary drive machine.

For example, the main drive machine is initially operated constantly at 50 percent of its peak torque, in particular under the assumption that the main drive machine reaches 100 percent peak torque. It is also assumed, for example, that the auxiliary drive machine delivers 50 percent of the peak torque of the main drive machine without being throttled. Now, for example, the torque of the auxiliary drive machine is increasingly throttled or increased while the torque of the main drive machine remains constant. This allows the drive torque acting on the respective drive wheels 12 and 14 to be changed in the opposite direction in any desired direction. If this is shown in a diagram using two straight lines, with these straight lines intersecting at an intersection point, the intersection point of the straight lines is the so-called differential point, in which the total output torque is distributed equally between the drive wheels 12 and 14, also known as outputs, with the reduced coupling gearing then rotating in the block when travelling straight ahead and acting like a symmetrical differential. It should be noted that, if necessary, torque distribution to the outputs is independent of the wheel speeds that occur, solely as a result of the different torques of the electric machines 16 and 24 that drive the reduced coupling gearing. This makes targeted torque vectoring possible.

Against this background, so-called symmetrization is advantageous. This means that not only the torque provided by the auxiliary drive machine is changed, but also that of the main drive machine in synchronization with it. For this project, it is particularly advantageous that the stator ratios of the two coupled planetary gear sets 32 and 34 are anti-symmetrical, i.e., they have the same absolute value but opposite mathematical signs, which is why the change in the torques of the two electric machines 16 and 24 can take place in opposite directions with the same gradient value (positive for one of the electric machines 16 and 24 and negative for the other electric machine 24 or 16). As a result, the total torque transmitted to the axis remains constant over the entire range of variation of the torques of the electric machines 16 and 24, also referred to as drive torques, as their sum.

FIG. 3 shows a diagram describing an example of a torque vectoring method with a symmetrical control method for the electric drive system 10 according to the invention for the variant shown in FIG. 1. In the diagram in FIG. 3, a percentage torque component M is plotted on the ordinate in relation to a total drive torque or a total output torque Mges during torque vectoring operation. A torque vectoring percentage TV is plotted on the abscissa. For example, +100% TV means that 100% of the total drive torque used during the torque vectoring process is directed to the right wheel, while-100% TV means that 100% of the total drive torque used during the torque vectoring process is directed to the left wheel.

At the beginning of an application of the method, for example, an equal torque distribution on both drive wheels (TV=0%) can be assumed. In this initial state, the third torques M3 and the fourth torques M4 each amount to 50% of the instantaneous total drive torque. FIG. 3 shows that in this initial state with TV=0%, the first torques M1 and the second torques M2 are not equal. At TV=0%, the first torques M1 are approximately 63% and the second torques are approximately 37%. If torque vectoring behavior, i.e., an unequal distribution of the total drive torque to the two wheels, is required, this can be achieved by increasing the first torques M1 by a certain amount and decreasing the second torques M2 by the same amount. The electric drive system 10 according to the invention is designed in such a way that, when this method is used, the third torques M3 and the fourth torques M4 each change by the same amount, but with the opposite sign, and thus a total output torque Mges remains constant, which is essential for the drivability of the motor vehicle. The total output torque Mges is approximately the sum of the third torques and the fourth torques as well as the sum of the first torques M1 and the second torques M2, if friction losses are disregarded.

Thus, for the purpose of torque vectoring to set a torque difference between the third torques M3 and the fourth torques M4, starting from a torque equality of the third torques and the fourth torques (at TV=0), the first torques M1 and the second torques M2 are each changed simultaneously, wherein the first torques M1 and the second torques M2 are each changed by the same amount, but with the opposite sign.

Such a behavior of the drive is advantageous or rather mandatory for a driver, as the driver expects a constant drive power with a constant accelerator pedal position, regardless of the extent of torque vectoring that occurs.

Another positive effect of the symmetrization of the behavior of the axle drive is that the gradients of the straight lines shown in the diagram in FIG. 3 for the third torques M3 and the fourth torques M4 as well as for the first torques M1 and the second torques M2 behave in opposite directions. This makes it much easier to control the behavior of the drive.

It should also be noted that the differential point also shifts as a result of the symmetrization. It is also advantageous that, when travelling straight ahead at the differential point, i.e., the operating point of the drive at which the same drive torque is applied to the outputs, the electric machines 16 and 24 are operated with different torques. It may therefore prove useful to integrate the electric machines 16 and 24 into the drive with different power outputs.

Any question as to which combination of performance capabilities makes the most sense, in particular based on the assumption that the performance of the main driving machine is always assumed to be 100 percent regardless of its nominal value, can be most easily derived by looking at a cornering maneuver. The basis for this is the so-called Kamm's circle, which in modern tires is an ellipse, a graphical visualization of the ratio of a tire's equal ability to absorb longitudinal and lateral forces based on its grip. For a given tire on a given road surface, the Kamm's circle scales linearly with the vertical contact force of the tire, especially in a good approximation and when the tire pressure is adjusted. The tire can only be loaded up to the maximum of the respective elliptical contour, beyond which the tire loses grip. At high drive forces, only low lateral guidance forces can be transferred at low slip angles within the slip limit, the envelope of which is represented by the Kamm's circle. Similarly, at high centrifugal forces, which place high demands on the tire's lateral guidance capability at high slip angles, only low driving forces can be safely transmitted. The physical limiting speed of a vehicle through a bend is influenced by many other vehicle parameters, but can be determined with sufficient approximation to where the tires can still compensate for the equivalent of the driving resistance after absorbing the centrifugal forces caused by cornering, in order to prevent the vehicle from slowing down, so that quasi-stationary cornering can be maintained. When exiting a bend, with an increasingly reduced steering angle, the centrifugal forces decrease progressively, wherein the ability to transmit a driving force increases with increasingly reduced lateral control. At the same time, the curve radius currently being navigated increases continuously and it is therefore possible to accelerate increasingly strongly. It follows that, if the longitudinal and lateral components of the driving dynamics are to be increased, a high degree of torque vectoring can be sensibly implemented in quasi-stationary cornering at low drive torques with low power output, but with increasing power output, an increasingly low degree can still sensibly increase the driving dynamics in most applications. However, on a handling course, for example, which is often used for spectacular vehicle tests, driving situations can arise in which a high degree of torque vectoring can still be useful even with high power outputs.

The determination of the limit up to which torque vectoring is to be considered sufficient can also be used to determine the ratio of the performance of the electric machines 16 and 24 that is still reasonable. It has been found that a power output of the auxiliary drive machine of approximately 63 percent of the power output of the main drive machine is ideal in terms of overall efficiency and overall performance. With a high utilization of the drive capability of the electric machines 16 and 24 configured such that the electric machines 16 and 24 are operated such that they are operated at 94 percent of the maximum total drive torque that can be delivered by the two motors, a sufficient amount of 33.33 percent of the drive torque delivered can still be available as symmetrical torque vectoring. This amount is limited by the torque capacity of the main drive machine, which, for example, cannot increase the drive torques any further after a certain point and therefore marks the limit of symmetrical torque vectoring. Beyond this point, torque vectoring may be possible, but no longer symmetrical. This means that it can be advantageous if the auxiliary drive machine has a torque capacity of 63 percent in relation to the torque capacity of the main drive machine. With lower total drive torques than the 94% mentioned, torque vectoring of up to 100 percent of the drive torque output by the two electric machines 16 and 24 is possible in wide ranges using the first embodiment, for example, i.e. the entire drive torque output can be directed to any one wheel of the axle.

By coupling the two drive machines (electric machines 16 and 24), the first embodiment can offer a more extensive, symmetrical torque vectoring capability than can be ensured with an arrangement of two machines acting independently of each other on one wheel each, even with the performance of the main drive machine in each case. This is because the ability of two identical electric machines, each acting independently on one wheel, to use 100 percent of the torque output in the form of torque vectoring inevitably ends at the 50 percent total drive torque of both machines.

One of the consequences of this is that if a torque vectoring behavior which, for example, provides about half of the yaw moment around the vertical axis of the vehicle during cornering is to be maintained until the end of cornering, the total torque of both motors only has to be reduced by a maximum of 6% with the first variant of the drive according to the invention, and then, as the cornering radius increases, increasingly less, in order to maintain a sufficient level of torque vectoring right into straight-ahead driving. This is particularly important because it can prevent the vehicle from understeering significantly if the torque vectoring level collapses during cornering. This creates an advantage over torque vectoring drives with wheel-specific motors, as these require a torque reduction of around 17% in order to achieve comparable behavior when exiting a bend.

The torque output of such a drive during acceleration at the differential point when travelling in a straight line can also be used as a further criterion for the meaningfulness of the 100 percent/63 percent ratio of the electric machines 16 and 24. For example, the main drive machine is accelerated from 0 percent to 100 percent, while the auxiliary drive machine is accelerated from 0 percent to 60 percent in order to always remain at the differential point. This results in a total of 160 percent of the performance of the main drive machine, i.e., 98.16 percent of the total installed total performance of the electric machines 16 and 24, of 100+ 63=163 percent of the main drive machine, which can be considered quite reasonable in view of the extended torque vectoring capabilities of this drive. The first embodiment thus proves to be quite suitable for high-performance vehicles. It therefore seems appropriate to provide a differential lock or the aforementioned differential lock in addition to the torque vectoring capabilities in order to ensure the ability to corner up to the physical limit. This is particularly the case because it can be easily integrated thanks to the favorable arrangement, as can be seen in FIGS. 1 and 2. Such a differential lock is also particularly compact and light, because in most applications an axle ratio can still be applied to the two outputs, by means of which the effective locking effect of the differential lock clutch can be multiplied. This is another particularly favorable feature of the electric drive system 10.

It should also be noted that the drive system 10 described in the two variants shown behaves with mirror symmetry with regard to the sign of the torques (M1 to M4). If drive torques are described as positive and thrust torques as negative, the behavior of both described variants of the drive system 10 in drive and thrust mode is mirror-symmetrical. As a result, the behavior of the electric drive system 10 during torque vectoring in drive mode can be transferred in mirror symmetry to overrun mode, whereby the overrun torques M3 and M4 result in overrun torques according to the same principle as in drive mode, i.e., overrun torques M1 and M2, which can be used to recuperate electrical energy and therefore to charge the vehicle battery. The possibility of wheel-specific levels of recuperated energy, similar to that described for torque vectoring, should be emphasized simply by controlling the recuperation level of the two electric motors. This also results in far-reaching possibilities for designing electric anti-lock braking system and electric stability program functions to improve driving stability. This means that an electric anti-lock braking system (eABS) and/or an electric stabilization function of the vehicle in critical driving situations (eESP), which is provided solely by the electronic control of the electric motors, can be implemented. The significantly higher cycle frequency that the eABS and eESP systems can achieve compared to their classic, prior-art versions via the vehicle's hydraulic-mechanical brake system has proven to be particularly advantageous for the driving experience and drivability of the vehicle.

In the first embodiment of the electric drive system 10, which is also referred to as an axle drive, with the two electric machines 16 and 24 designed or functioning as driving machines and connected or connectable to one another via the reduced coupling gearing 30, a simultaneous drive of the electric machines 16 and 24 can be provided in at least virtually any driving state.

The second embodiment makes it possible to switch off one of the travelling machines in driving situations in which only a fraction of the installed power is required, for example in city traffic, and to drive only with the other driving machine in normal differential operation. In the second embodiment, the planetary gear sets 32 and 34, which are preferably designed as spur gear planetary stages, have the aforementioned common support, since the planet carriers 46 and 50 are, in particular permanently, connected for conjoint rotation to one another. In the second embodiment, the planetary gear sets 32 and 34 have a common overall sun gear, since the sun gears 44 and 49 are, in particular permanently, connected for conjoint rotation to one another. In particular, it is conceivable that the planet carriers 46 and 50 are formed integrally with one another. Alternatively, or additionally, the sun wheels 44 and 49 can be formed integrally with one another, in particular in the second embodiment. With regard to the first embodiment, it is conceivable that the ring gears 48 and 52 are formed integrally with one another. In the second embodiment, the ring gear 52 is drivable by the electric machine 24. The electric machine 16 can optionally drive the ring gear 52 or the ring gear 48. In particular to enable symmetrical torque vectoring, the ring gear 48 can be driven by the electric machine 16. A special feature of the second embodiment is in particular that the electric machine 16, in particular its rotor 20, can be connected for conjoint rotation to the ring gear 48 or to the ring gear 52 by means of the switching elements S1 and S2. In particular, the switching elements S1 and S2 are formed by a three-state actuator or a three-state switching element, in particular of any design. Preferably, the switching element S1 and/or S2 is designed as a form-fit switching element, in particular as a dog clutch. In other words, it is conceivable that the first switching element S1 and/or the second switching element S2 are designed as a dog clutch or as a form-fit clutch, i.e., as a form-fit switching element. Thus, for example, the rotor 20 can truly be connected to the ring gear 48 or the ring gear 52, in particular form-fittingly, by means of the switching elements S1 and S2. It is conceivable that the switching element S1 and/or S2 is designed as a frictionally engaged switching element and thus, for example, as a disc clutch or friction clutch.

In particular, in a switching state in which the ring gear 48 is connected for conjoint rotation to the rotor 20 by means of the switching element S1, this results in a torque vectoring state of the electric drive system 10, which functions or is designed as an axle drive. In another switching state, the rotor 20 is connected for conjoint rotation to the ring gear 52 by means of the switching element S1, which results in a so-called boost state of the axle drive by simply summing the outputs of the two electric machines 16 and 24. The boost state is also referred to as the acceleration state or assistance state. In the boost state, the planetary gear set 34, which is preferably designed here as a plus planetary stage, since, for example, the second stationary gear ratio is positive and the first stationary gear ratio is negative, operates like a symmetrical axle differential, with the planetary gear set 32, which is also referred to as a minus planetary gear set, being uninvolved in this case. Lastly, the electric machine 16 can be completely decoupled from the reduced coupling gearing 30, in particular in a third switching state. In other words, if the switching element S1 is in its coupled state while the switching element S2 is in its decoupled state, the rotor 20 is connected for conjoint rotation to the ring gear 48 by means of the switching element S1. If the switching element S2 is in its coupled state while the switching element S1 is in its decoupled state, the rotor 20 is connected for conjoint rotation to the ring gear 52 by means of the switching element S2. If the switching elements S1 and S2 are in their decoupled states, in particular simultaneously, the rotor 20 is decoupled both from the ring gear 48 and from the ring gear 52, so that the electric machine 16 is decoupled from the reduced coupling gearing 30, in particular completely.

It is preferably provided that the switching elements S1 and S2 comprise a common switching part that can be moved, in particular relative to the housing 22, between a first switching position, a second switching position and a third switching position. For example, the switching part can be moved in translation or rotation relative to the housing 22 between the switching positions. In the first switching position, for example, the switching element S1 is in its coupled state, while the switching element S2 is in its uncoupled state. In the second switching position, for example, the switching element S2 is in its coupled state, while the switching element S1 is in its decoupled state. In the third switching position, for example, the switching elements S1 and S2 are in their decoupled states, in particular simultaneously. If the electric machine 16 is completely decoupled from the reduced coupling gearing 30, the other electric machine 24 is active on its own, which opens up efficiency potential in the range of low power levels requested. The outputs to the two drive wheels 12 and 14 of the drive axle take place via the common support of the reduced coupling gearing for the drive wheel 14 and via the common overall sun gear for the drive wheel 12. This allows an advantageous design, because it is compact, of the reduced coupling gearing to be achieved.

The three different operating modes of the second embodiment are described below. A first of the operating modes is a torque vectoring mode, in which, for example, the shifting part is in its first switch position, i.e., the switching element S1 is in its coupled state and the switching element S2 is in its decoupled state. For torque vectoring mode, the electric machine 16 is thus connected to the ring gear 48 for conjoint rotation. This results in a corresponding behavior at a constant operating point of the electric machine 24, which is to be regarded here as the main drive machine and which is again regarded as 100 percent power (or torque capacity), irrespective of its effective performance, when the output torque of the electric machine 16 changes from the originally identical torque in the same direction as that of the electric machine 24 beyond the zero point to the torque which is again identical but in the opposite direction. For this purpose, the electric machine 24 is operated constantly at 50 percent of its capacity, for example. For example, the electric machine 16 is continuously changed via iteration steps from the same torque in the same direction to the same torque in the opposite direction. This results in corresponding, opposing torque curves at the outputs of the axle drive, i.e., at the drive wheels 12 and 14, and as their sum the total output torque of the drive. As in the first embodiment, the gradients of the two outputs or of the respective straight lines visualizing the torques of all outputs are different and the total torque corresponds to the actual target power of 50 percent torque of the electric machine 24 at the differential point alone, at the zero crossing of the torque output by the electric machine 16. This may be undesirable. For this reason, a method for symmetrizing the axle drive is also used for the second embodiment, which is carried out slightly differently but achieves the same goal, namely a constant total output torque over the entire possible torque vectoring range and also equal and opposing gradients of the output torques. The different procedures with the same result of complete symmetrization are possible and advantageous. When travelling straight ahead at the differential point, the electric motor 16 runs at axle speed, and, when cornering at the differential point, it runs at a speed dependent on the differential speed of the drive wheels 12 and 14 without load. With this initial position, symmetrical torque vectoring of still 29.33 percent of the torque achieved by the electric machine 24, which is the sole one in this state, at its 87 percent torque utilization can be achieved, which is advantageous. The limit of the symmetrical torque vectoring is reached at the full load of the electric machine 24.

The torque of the torque-reduced drive reverses after a zero crossing. A negative torque directed against the direction of travel is present, but this may not be desirable for road vehicles in normal driving situations, which is why the range extending beyond 100 percent as a result of this torque reversal can be ignored. The second embodiment can also utilize a wider, symmetrical torque vectoring range than would be possible with the use of two motors equivalent to the electric machine 24, each of which independently drives one of the two drive wheels 12 and 14 of the axle. The reasoning is the same as the previous one. In order to minimize the energy consumption of the electric machine 16, which is approximately equivalent to the internal losses of the electric machine 16 and its bearing friction, in all driving situations in which torque vectoring is not desired or expected, the electric machine 16 can be switched off by switching off the switching element S1 or S2, which couples the electric machine 16 to the ring gear 48 for the torque vectoring mode, and the electric machine 16 can be virtually shut down. This allows the second embodiment to be operated in a particularly efficient mode with the electric motor 24 alone. If driving conditions are to be covered in which the power of the electric motor 24 is not considered sufficient, the additional power of the electric motor 16 can be utilized together with the electric motor 24 in the so-called boost mode or boost operation by switching the electric motor 16 to the ring gear 52 by means of the switching element S1 or S2. In order to be able to utilize symmetrical torque vectoring in the second embodiment, which can be considered sufficient, it is advantageous if the first electric machine 16 can achieve at least about 15 to 20 percent of the torque capacity of the second electric machine 24, i.e., the main drive machine. However, the final design of the performance of the first electric machine 16 can go beyond this as desired if a higher, desired boost power is required. The second embodiment therefore proves to be particularly versatile. High driving dynamics can be achieved by alternately operating the arrangement in torque vectoring and boost modes. It is therefore also advisable to provide a differential lock for this second embodiment. This is because the advantages listed at the outset and when considering the first embodiment also apply to a large extent to this second embodiment. In addition, it can also be stated that when the drive is operated in boost mode with the total power of the electric machines 16 and 24 or with the electric machine 24 alone, the axle drive takes place via an open differential, the capabilities of which are known to be increased by a limited slip differential. This also shows that when the electric motor 16 is decoupled from the reduced coupling gearing 30, the motor vehicle can be operated particularly efficiently with less power development. This is a state that emphasizes the particularly wide versatility of the axle drive.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 drive system
12 drive wheel
14 drive wheel
16 first electric machine
18 first stator
20 first rotor
22 housing
24 second electric machine
26 second stator
28 second rotor
30 reduced coupling gearing
32 first planetary gear set
34 second planetary gear set
36 first input shaft
38 second input shaft
40 first output shaft
42 second output shaft
44 first sun gear
46 first planet carrier
48 first ring gear
49 second sun gear
50 second planet carrier
52 second ring gear
54 first planetary gear
56 second planetary gear 58 third planetary gear
60 first transmission stage
62 first side shaft
64 second transmission stage
66 second side shaft
M torque component
M1 first torques
M2 second torques
M3 third torques
M4 fourth torques
Mges total output torque
TV torque vectoring extent
S1 switching element
S2 switching element
VS blocking switching element

The invention claimed is:

1. An electric drive system for a motor vehicle, the electric drive system comprising:
   a first electric machine with a first rotor;
   a second electric machine with a second rotor; and
   a reduced coupling gearing comprising a first planetary gear set, a second planetary gear set, a first input shaft, a second input shaft, a first output shaft, and a second output shaft,
   wherein the first input shaft is configured to introduce first torques emanating from the first electric machine into the reduced coupling gearing,
   wherein the second input shaft is configured to introduce second torques emanating from the second electric machine into the reduced coupling gearing,
   wherein the first output shaft is configured to divert third torques from the reduced coupling gearing,
   wherein the second output shaft is configured to divert fourth torques from the reduced coupling gearing,
   wherein the first planetary gear set has a first element connected or connectable for conjoint rotation to the first rotor, a second element connected for conjoint rotation to the first output shaft, and a third element connected for conjoint rotation to the second output shaft,
   wherein the second planetary gear set has a fourth element connected for conjoint rotation to the second rotor and a fifth element connected for conjoint rotation to the second element,
   wherein the second planetary gear set has a sixth element connected for conjoint rotation to the third element,
   wherein a first stationary gear ratio of the first planetary gear set has a same value and an opposite sign compared to a second stationary gear ratio of the second planetary gear set,
   wherein the first element of the first planetary gear set is a first ring gear,
   wherein the fourth element of the second planetary gear set is a second ring gear,
   wherein the third element of the first planetary gear set is a first sun gear, and
   wherein the sixth element of the second planetary gear set is a second sun gear.

2. The electric drive system of claim 1, wherein
   the second element of the first planetary gear set is a first planet carrier in a form of a single planet carrier with first planet gears,
   the fifth element of the second planetary gear set is a second planet carrier in a form of a double planet carrier with second planet gears and third planet gears, and
   the first planet gears are formed separately from the second planet gears and separately from the third planet gears.

3. The electric drive system of claim 1, wherein the third element of the first planetary gear set and the sixth element of the second planetary gear set have a same toothing diameters and a same number of teeth.

4. The electric drive system of claim 1, further comprising:
   a first transmission stage, which, in relation to a first torque flow along which the third torques are to be transmitted out of the reduced coupling gearing via the first output shaft, is arranged in the first torque flow downstream of the first output shaft, and
   a second transmission stage, which, in relation to a second torque flow along which the fourth torques are to be discharged from the reduced coupling gearing via the second output shaft, is arranged in the second torque flow downstream of the second output shaft, wherein the first transmission stage, the second transmission stage, the reduced coupling gearing, and the first and second rotors are arranged in a common housing of the electric drive system.

5. The electric drive system of claim 4, wherein the reduced coupling gearing, the first and second rotors, and the first and second transmission stages are arranged coaxially to one another.

6. The electric drive system of claim 1, wherein the reduced coupling gearing comprises exactly two planetary gear sets, wherein are the first planetary gear set and the second planetary gear set.

7. The electric drive system of claim 1, further comprising:
   a first switching element configured to connect the first rotor to the first ring gear for conjoint rotation, and
   a second switching element configured to connect the first rotor to the second ring gear for conjoint rotation.

8. The electric drive system of claim 1, further comprising:
   a blocking switching element configured to connect two of the elements of the reduced coupling gearing to one another in a frictionally engaged manner.

9. A torque vectoring method for controlling an electric drive system comprising a first electric machine with a first rotor, a second electric machine with a second rotor, a reduced coupling gearing comprising a first planetary gear set, a second planetary gear set, a first input shaft, a second input shaft, a first output shaft, and a second output shaft, wherein the first input shaft is configured to introduce first torques emanating from the first electric machine into the reduced coupling gearing, wherein the second input shaft is configured to introduce second torques emanating from the second electric machine into the reduced coupling gearing, wherein the first output shaft is configured to divert third torques from the reduced coupling gearing, wherein the second output shaft is configured to divert fourth torques from the reduced coupling gearing, wherein the first planetary gear set has a first element connected or connectable for conjoint rotation to the first rotor, a second element connected for conjoint rotation to the first output shaft, and a third element connected for conjoint rotation to the second output shaft, wherein the second planetary gear set has a fourth element connected for conjoint rotation to the second rotor and a fifth element connected for conjoint rotation to the second element, wherein the second planetary gear set has a sixth element connected for conjoint rotation to the third element, wherein a first stationary gear ratio of the first planetary gear set has a same value and an opposite sign compared to a second stationary gear ratio of the second planetary gear set, wherein the first element of the first planetary gear set is a first ring gear, wherein the fourth element of the second planetary gear set is a second ring gear, wherein the third element of the first planetary gear set is a first sun gear, and wherein the sixth element of the second planetary gear set is a second sun gear, method comprising:

setting a torque difference between the third torques and the fourth torques, starting from a torque equality of the third torques and the fourth torques, by simultaneously changing the first torques and the second torques by a same amount but with opposite signs.

* * * * *